United States Patent [19]

McClure

[11] 3,897,666

[45] Aug. 5, 1975

[54] PANEL MOUNTING STRIP WITH INTEGRAL RETAINER

[75] Inventor: Randall D. McClure, Decatur, Ill.

[73] Assignee: Caterpillar Tractor Co., Peoria, Ill.

[22] Filed: Oct. 9, 1973

[21] Appl. No.: 404,310

[52] U.S. Cl. .................. 52/400; 29/469; 52/208; 52/396
[51] Int. Cl.² ............................................ B60J 1/00
[58] Field of Search ............ 52/204, 398, 400, 403, 52/404, 627, 214, 506, 475, 502, 208, 623, 627, 628, 476, 494, 105, 753 C, 396; 29/469

[56] References Cited
UNITED STATES PATENTS

| | | | |
|---|---|---|---|
| 2,683,905 | 7/1954 | Beck | 52/400 |
| 2,698,072 | 12/1954 | Beck | 52/400 |
| 2,759,575 | 4/1956 | Marvin | 52/400 |
| 3,768,220 | 10/1973 | Riegelman, Jr. | 52/208 |

*Primary Examiner*—Frank L. Abbott
*Assistant Examiner*—Robert Farber
*Attorney, Agent, or Firm*—Phillips, Moore, Weissenberger Lempio & Strabala

[57] ABSTRACT

Panel-mounting means are provided for mounting a window pane or other panel in a corresponding frame, and include insulation-securing means for securing insulating material adjacent to the frame.

The panel mounting means of the invention include an elongated elastomeric strip having a longitudinally extending frame-receiving groove and a longitudinally extending panel-receiving groove opposite the frame-receiving groove. The mounting means further include insulation-securing means comprising cantilevered arm means adapted to secure insulating material adjacent to the frame.

3 Claims, 3 Drawing Figures

PATENTED AUG 5 1975 3,897,666
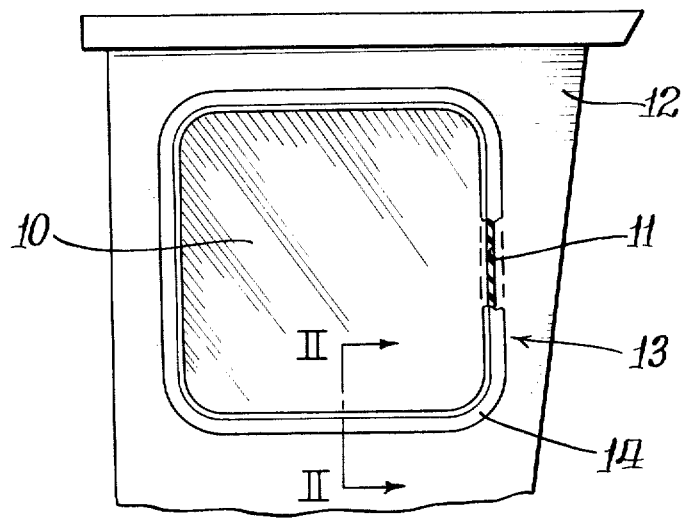
Fig-1-
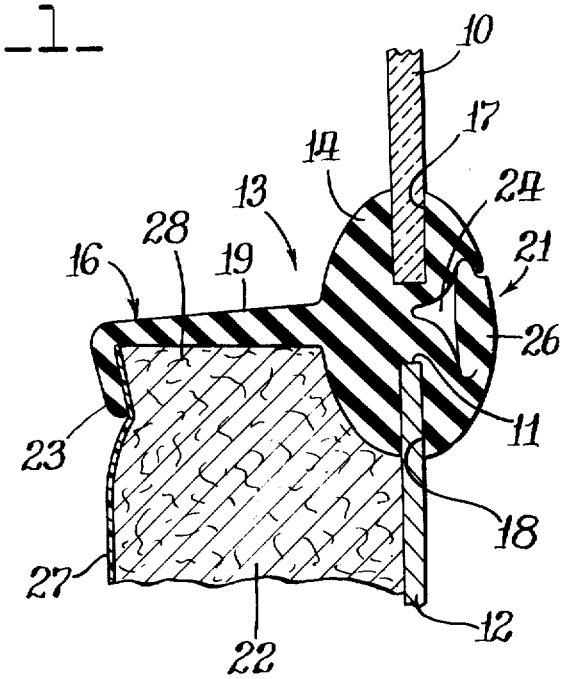
Fig-2-
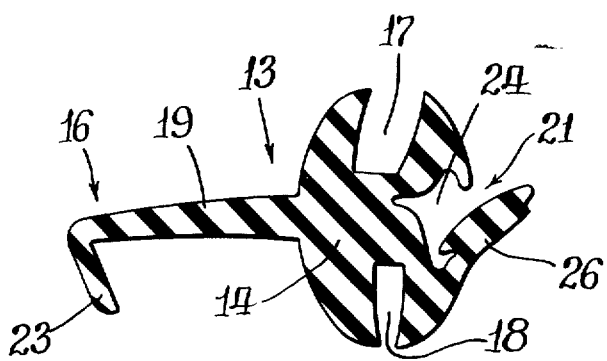
Fig-3-

PANEL MOUNTING STRIP WITH INTEGRAL RETAINER

BACKGROUND OF THE INVENTION

This invention relates to panel mounting means of the type used to mount window panes or similar panels. In particular the invention relates to such panel mounting means including an elongated elastomeric strip provided with panel- and frame-receiving grooves for mounting panels in a corresponding frame; the panel mounting means further includes insulation securing means for securing insulating material to the panel mounting means.

Elastomeric strips having longitudinal grooves are conventionally used for mounting window panes or other panels in frames or window openings of vehicle cabs and the like. Typically, such strips are provided with two opposing longitudinal grooves, one of which is adapted to receive a pane of glass, and the other of which is adapted to receive the flanges of the window opening or frame. These strips ideally provide both an effective means of mounting the panel, and a substantially leak-proof seal between the panel and frame. Exemplary of such prior art mounting means are those described in U.S. Pat. Nos. 3,397,008 and 3,338,015.

Recently, OSHA requirements have made it necessary to provide sound-suppressive insulating material in the interior of operator cabs of earthmoving vehicles to reduce the noise reaching the operator to acceptable levels. This insulation must be secured by some means around the window openings of the cab, and numerous attempts have been made to resolve this problem effectively.

Prior means for securing this insulating material have variously included adhesives, channels, snaps, clips, and similar securing means. Adhesives, in particular, are not favored, due both to their messiness and the time consumed during the setting period. Further, toxic fumes are characteristically emitted from the adhesives in common use, creating a safety hazard and requiring a well-ventilated work area. Channel, clip and snap securing means contribute significantly to overall expense due to the numerous extra components required, and to the typical necessity of separate installation in the cab. Additionally, in most of these instances, the edges of the insulating material must be finished prior to installation, in order not to detract from the appearance of the cab interior. Also, there is the further disadvantage that employment of these securing means usually renders removal of the insulating material for cleaning or other purposes difficult and/or time consuming.

BRIEF SUMMARY AND OBJECTS OF THE INVENTION

Accordingly, the invention provides panel mounting means for mounting a window pane or other panel in a corresponding frame, including insulation securing means for securing insulating material adjacent to the frame.

The panel mounting means includes an elongated elastomeric strip having a frame-receiving groove extending longitudinally therein and a panel-receiving groove opposing the frame receiving groove. The mounting means further includes insulation-securing means comprising cantilevered arm means adapted to secure insulating material around a frame.

It is therefore an object of this invention to provide panel mounting means in combination with insulation-securing means for effeciently securing insulating material adjacent to a panel frame.

It is another object of this invention to provide inexpensive insulation-securing means for securing insulating material adjacent to a panel frame.

It is a further object of this invention to provide insulation securing means for securing insulating material adjacent to a panel frame which facilitate removal of the insulating material.

It is an additional object of this invention to provide insulation-securing means for securing insulating material adjacent a panel frame which eliminate the aesthetic necessity of finishing the edges of the insulating material thereby substantially reducing its cost.

Other objects and advantages of the invention will be apparent from the description and the appended claims.

BRIEF SUMMARY OF THE DRAWINGS

FIG. 1 is a fragmentary elevation of a wall such as the side panel of a vehicle including a window pane or other panel mounted in an opening therein by the panel mounting means of this invention;

FIG. 2 is an enlarged cross sectional elevation of a preferred embodiment of the panel mounting means of this invention, taken along the lines II—II of FIG. 1, illustrating a panel mounted in a frame by the panel mounting means and insulating material secured by the insulation securing means; and FIG. 3 is a cross sectional view of a preferred embodiment of the panel mounting means of this invention.

DETAILED DESCRIPTION OF THE INVENTION

With particular reference to FIG. 1, a transparent window pane or panel 10 is shown mounted in a window opening or frame 11 of a wall 12, such as a side panel of an operator cab of an earthmoving vehicle. The panel 10 is mounted in the frame 11 by panel mounting means generally indicated at 13.

As best shown in FIGS. 2 and 3, panel mounting means 13 generally include an elongated elastomeric strip 14 and insulation securing means 16. The elastomeric strip 14 is provided with a first longitudinally-extending panel-receiving groove 17, for receiving an edge of panel 10, and a second longitudinally extending frame-receiving groove 18 oppsite the panel-receiving groove 17 for receiving an edge of the frame 11.

The insulation securing means 16 generally includes cantilevered arm means 19 extending longitudinally along the strip 14 in a plane generally perpendicular to the plane of the grooves 17 and 18. The arm means 19 is provided with means for gripping an insulating material 22 such as lip means 23 for compressing the compressible insulating material against the frame 11, thereby securing it in position against the wall 12. The lip means 23 comprises a projection longitudinally extending along the distal end of the arm means 19 and suitably angled toward the frame receiving groove 18 so that the insulating material 22 is gripped and compressed against the frame 11 by the lip means 23. Preferably, the insulation-securing means 16 is integrally formed with the strip 14.

In a preferred embodiment of this invention, illustrated in detail in FIGS. 2 and 3, the panel mounting means 13 include an elongated elastomeric strip 14 having an elliptically-shaped body portion, and insulation-securing means 16 comprising cantilevered arm means 19 provided with lip means 23. Preferably, the insulation-securing means 16 are integrally formed with the strip 14. The arm means 19 are disposed on the strip 14 generally in line with the transverse axis thereof, with lip means 23 angled toward the frame-receiving groove 18. The elliptical body portion of the strip 14 is provided with longitudinally extending grooves 17 and 18 disposed on the longitudinal axis of the ellipse for receiving the panel 10 and the frame 11, respectively. The strip 14 further includes biasing means 21 for biasing the walls of grooves 17 and 18 against the panel 10 and the frame 11, respectively. In the preferred embodiment, the biasing means 21 include a cavity 24 and a plug or locking flap 26 forcibly engageable within the cavity 24; when the panel 10 is mounted in the frame 11 as shown in FIG. 2, forcible engagement of flap 26 in cavity 24 distends the cavity 24, and biases the walls of the grooves 17 and 18 into sealing engagement with the panel 10 and frame 11, thereby securing the panel 10 in the frame. Preferably, flap 26 is integrally formed with the strip 14.

Panel 10 is mounted in the frame 11, and the insulating material secured adjacent to the frame by the panel mounting means 13, in the following manner.

Frame 11 is measured along its periphery, and the strip 14 cut to an appropriate length for ensuring a tight fit around the frame after installation. The cut strip 14 is then worked around the peripheral edges of the frame 11 to engage the frame in the frame-receiving groove 18 so that arm means 19 extends into the cab, or toward the side of the frame to adjoin the insulation. The peripheral edges of the panel 10 are then fitted into the panel-receiving groove 17 of the strip 14, and the locking flap 26 is forcibly engaged within the cavity 24, as by a locking tool (not shown), to seal and secure panel 10 within frame 11.

Compressible insulating material 22, such as foam rubber, is cut to the appropriate shape for application to the interior of the cab. For purposes of appearance, the insulating material is preferably of a laminated construction with a perforated vinyl covering 27 affixed to one side thereof. The material is then positioned adjacent the frame 11, with a peripheral edge 28 conforming to the panel mounting means 13 disposed under the arm means 19. The insulating material 22 is secured in position by bending the arm means 19 toward the panel 10, inserting the insulating material under the arm means, and repositioning the arm means so that the lip means 26 grips and compresses the material against the frame 11.

The insulating material is thus securely positioned, readily removable, and easily secured. Further, since the arm means 19 conceals the edge 28 of the insulating material, it is apparent that the edge need not be finished to provide a good appearance, thereby substantially reducing the cost of the material.

It is to be understood that the foregoing description is merely illustrative of the preferred embodiments of the invention and that the scope of the invention is not to be limited thereto, but is to be determined by the scope of the appended claims.

What is claimed is:

1. In combination a panel, a frame, compressible insulating material, and panel mounting and insulation securing means for mounting said panel in a corresponding frame and securing said insulation material including
    a. an elongated elastomeric strip including an eliptical body portion having a first longitudinally-extending panel-receiving groove disposed substantially along the longitudinal axis of said eliptical body portion and receiving said panel and a second longitudinally extending frame-receiving groove disposed opposite to and in line with said panel-receiving groove receiving said frame; and
    b. insulation-securing means including cantilevered arm means extending longitudinally of said elastomeric strip substantially in a line with the transverse axis of said eliptical body portion, said cantilevered arm means including insulation-gripping means gripping said insulating material and securing it in position adjacent said frame, said gripping means including lip means for compressing said compressible insulating material against said frame, said lip means comprising a projection extending longitudinally along the distal end of said arm means, said projection being angled toward said frame-receiving groove and functioning to compress and secure said insulating material against said frame, and wherein said cantilevered arm means and insulation-gripping means are of integral one-piece construction with said elongated elastomeric strip.

2. The invention of claim 1, wherein said panel-mounting means further include biasing means for biasing the walls of said first panel-receiving groove against said panel into sealing engagement therewith, and for biasing the walls of said second frame-receiving groove against said frame into sealing engagement therewith.

3. The invention of claim 2, wherein biasing means include a cavity longitudinally extending along said strip opposite to said arm means and a plug means forcibly engageable within said cavity so that engagement of said plug means in said cavity distends said cavity, thereby biasing the walls of said first panel-receiving groove against said panel and the walls of the second frame-receiving groove against said groove to secure said panel in said frame.

* * * * *